US008305251B2

(12) United States Patent
Chiueh

(10) Patent No.: US 8,305,251 B2
(45) Date of Patent: Nov. 6, 2012

(54) WIRELESS REMOTE CONTROL SYSTEM

(75) Inventor: Tzi-Dar Chiueh, Taipei (TW)

(73) Assignee: National Taiwan University, Taipei (TW)

( * ) Notice: Subject to any disclaimer, the term of this patent is extended or adjusted under 35 U.S.C. 154(b) by 467 days.

(21) Appl. No.: 12/702,792

(22) Filed: Feb. 9, 2010

(65) Prior Publication Data

US 2011/0193737 A1 Aug. 11, 2011

(51) Int. Cl.
*H04L 17/02* (2006.01)

(52) U.S. Cl. .......................... 341/176; 341/173; 341/177

(58) Field of Classification Search .................. 341/173, 341/176

See application file for complete search history.

(56) References Cited

U.S. PATENT DOCUMENTS

| | | | | |
|---|---|---|---|---|
| 4,208,654 | A * | 6/1980 | Vogt et al. | 341/20 |
| 4,578,674 | A | 3/1986 | Baker et al. | |
| 4,654,648 | A | 3/1987 | Herrington et al. | |
| 5,999,167 | A | 12/1999 | Marsh et al. | |
| 6,441,770 | B2 * | 8/2002 | Russell | 341/176 |
| 6,504,526 | B1 | 1/2003 | Mauritz | |
| 7,353,134 | B2 * | 4/2008 | Cirielli | 702/152 |
| 2007/0115252 | A1 | 5/2007 | Burgmans | |

* cited by examiner

*Primary Examiner* — Khai M Nguyen
(74) *Attorney, Agent, or Firm* — Chun-Ming Shih

(57) ABSTRACT

A wireless remote control system is provided. This system includes a remote controller, plural detectors, and a decision module. The detectors are used for detecting the frequency a wireless signal emitted by the remote controller and respectively generate a detecting result. Based on at least one frequency difference between the detecting results, the decision module determines how the remote controller is moving and thereby generates a control signal. Because the decision module needs no knowledge of the frequency of the emitted wireless signal, the wireless remote controller has the advantages of small size, low cost, and low power consumption.

20 Claims, 3 Drawing Sheets

Figure 1:
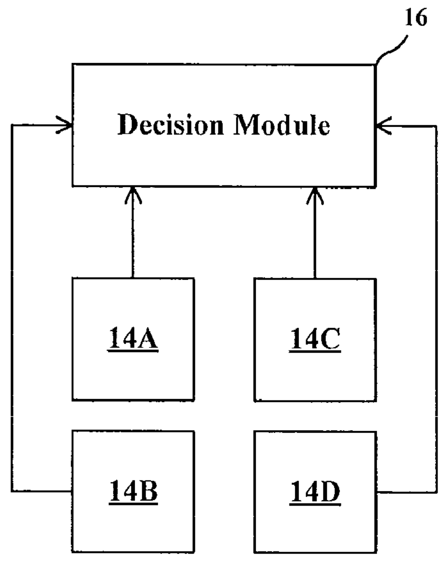

| Move Pattern (Gesture) |  | 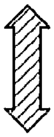 | 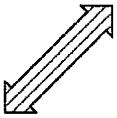 | 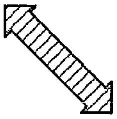 |
|---|---|---|---|---|
| $f_1$ - $f_2$ | Without periodicity | Periodical + Large amplitude | Periodical + Small amplitude | Periodical + Small amplitude |
| $f_1$ - $f_3$ | Periodical + Large amplitude | Without periodicity | Periodical + Small amplitude | Periodical + Small amplitude |
| $f_1$ - $f_4$ | Periodical + Small amplitude | Periodical + Small amplitude | Without periodicity | Periodical + Large amplitude |
| $f_2$ - $f_3$ | Periodical + Small amplitude | Periodical + Small amplitude | Periodical + Large amplitude | Without periodicity |
| $f_2$ - $f_4$ | Periodical + Large amplitude | Without periodicity | Periodical + Small amplitude | Periodical + Small amplitude |
| $f_3$ - $f_4$ | Without periodicity | Periodical + Large amplitude | Periodical + Small amplitude | Periodical + Small amplitude |
| Characteristic | With obvious periodicity at the horizontal direction | With obvious periodicity at the vertical direction | With obvious periodicity at the right oblique direction | With obvious periodicity at the left oblique direction |

FIG. 3(A)

| Move Pattern (Gesture) | 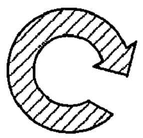 | 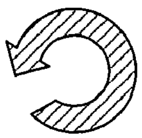 | 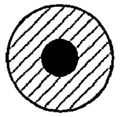 |
|---|---|---|---|
| $f_1$ - $f_2$ | Periodical + Large amplitude | | Small amplitude |
| $f_1$ - $f_3$ | Periodical + Large amplitude | | Small amplitude |
| $f_1$ - $f_4$ | Periodical + Large amplitude | | Small amplitude |
| $f_2$ - $f_3$ | Periodical + Large amplitude | | Small amplitude |
| $f_2$ - $f_4$ | Periodical + Large amplitude | | Small amplitude |
| $f_3$ - $f_4$ | Periodical + Large amplitude | | Small amplitude |
| $f_1+f_2+f_3+f_4$ | Small amplitude | | Periodical + Large amplitude |
| Characteristic | Periodical at every direction; when the gesture is clockwise the order of appearance of the maximum amplitudes at different directions is different from that when the gesture is counterclockwise | | $f_1$, $f_2$, $f_3$, and $f_4$ are all periodical |

FIG. 3(B)

WIRELESS REMOTE CONTROL SYSTEM

BACKGROUND OF THE INVENTION

1. Field of the Invention

The present invention relates to remote control systems. In particular, the present invention relates to wireless remote control systems that determine control signals based on users' gestures.

2. Description of the Prior Art

Wireless control of electrical/electronic devices, for instance, garage door opening, audio/video equipment (TV) control, air conditioner control, projector control, wireless mouse, and so on, is becoming indispensable. Wireless controllers provide the convenience that saves users from walking to the devices that they want to control. Most commercial wireless controllers at the present time are based on radio-frequency (RF) or infrared signals to communicate the intended commands to the controlled devices.

Practically, besides RF and infrared signals, ultrasonic signals can also be used for remote wireless control purpose. U.S. Pat. No. 4,578,674 discloses a wireless cursor control using a position device (mouse). In this patent, two detectors disposed at the computer side detect how a wireless mouse moves based the ultrasonic signal emitted by the mouse; a cursor on a display panel is accordingly controlled. Because of the Doppler effect, the frequencies detected by the two detectors (represented as $f_1$ and $f_2$) at the computer side are different from the original frequency of the ultrasonic signal emitted by the mouse (represented as $f_0$). The microprocessor at the computer side first calculates the difference between $f_1$ and $f_0$ and the difference between $f_2$ and $f_0$. According to the two differences, the microprocessor estimates the direction and velocity of the mouse motion relative to the detectors. Then the patent calculates the movement of the position device from an initial location and moves the cursor on the display accordingly.

The disadvantage of the above idea is that the calculation is highly related to the reference frequency of the ultrasonic signal emitted by the mouse ($f_0$). More specifically, the calculation cannot be done without knowing the value of $f_0$. Hence, in U.S. Pat. No. 4,578,674, an infrared emitter for providing a reference signal is set at the computer side. Correspondingly, an infrared receiver for receiving the reference signal is set on the position device (mouse). A continuous-wave signal with the exact frequency $f_0$ is carried on an infrared signal through modulation. At the position device, an infrared receiver and a demodulator can recover that signal for generation of the ultrasonic signal with frequency $f_0$. In other words, through this reference signal, the computer side controls the frequency of the ultrasonic signal emitted by the mouse ($f_0$). However, including an infrared receiver at the remote control device increases both its size and power consumption, rendering such control mechanism undesirable.

U.S. Pat. No. 4,654,648 also utilizes acoustic signal emitted from the controller and measure the time difference between signals arriving at several different acoustic receivers. Using triangulation, the patent can determine the position of the controller. This patent does not teach a wireless remote control based on Doppler effect induced from the motion of the controller.

U.S. Pat. No. 5,999,167 teaches another wireless cursor control system based on ultrasonic signal. The ultrasonic signal is emitted from the base unit and the remote controller is equipped with multiple ultrasonic receivers. The phases of the received ultrasonic signals are captured and compared to determine the angular orientation of the remote unit and therefore cursor movement on the display can be accordingly controlled according to the detected orientation change.

U.S. patent application US2007/0115252 is based on U.S. Pat. No. 5,999,167 and includes an extra sensitivity adjuster to extend the application of U.S. Pat. No. 5,999,167 to the cases when the remote controller is at a far distance away from the base unit.

U.S. Pat. No. 6,504,526 presents a wireless pointing device based on infrared signals. Multiple receivers receive infrared pulse-train signal from a transmitter. As the remote unit is moved, the wavefront will arrive at different receivers at different times. By detecting the peaks in the received signal's amplitude (or envelope) and compare their arrival times, movement along a particular direction of the remote control unit can be detected.

In summary, most prior arts use either IR or RF signals for remote control or cursor control. Of those that use ultrasonic signals, most detect the arrival times of the signal or the phases of the signals. Only U.S. Pat. No. 4,578,674 detects the frequencies of the received ultrasonic signals. However, in order to calculate the absolute frequency difference, and thus absolute velocity of the transmitter, U.S. Pat. No. 4,578,674 sends a reference signal with frequency $f_0$ to the remote controller. This requires an extra pair of infrared transmitter and receiver, which necessitates more cost and power consumption.

SUMMARY OF THE INVENTION

The wireless remote control system according to the invention also operates based on the concept of the Doppler effect induced by the movement of a remote controller, which emits a wireless signal consisting of tone(s) of one frequency or a group of several frequencies. However, the host side in the invention does not have to know the exact frequency of the wireless signal emitted by the remote controller. Accordingly, the infrared emitter and infrared receiver in U.S. Pat. No. 4,578,674 can be omitted.

One embodiment according to the invention is a wireless remote control system including a remote controller, a plurality of detectors, and a decision module. The detectors are used for detecting a wireless signal emitted by the remote controller and respectively generating a detecting result. Based on at least one frequency difference between the detecting results, the decision module determines a movement pattern of the remote controller and generates a control signal intended by the user holding the remote controller accordingly.

Another embodiment according to the invention is a wireless remote control system including a remote controller, a detector, and a decision module. The detector is used for detecting the wireless signal emitted by the remote controller and generating a detecting result. Based on at least one frequency difference between the detecting results detected at different times, the decision module determines a movement pattern of the remote controller and generates a control signal intended by the user holding the remote controller accordingly.

Another embodiment according to the invention is also a wireless remote control system including a remote controller, a detector, and a decision module. The detector in this embodiment is used for detecting the frequency of the wireless signal emitted by the remote controller. The decision module generates a control signal according to a time pattern of the frequency.

The wireless remote controller according to the invention has many advantages, such as small size, low cost, low power consumption, and easy to use. Further, the wireless remote control system can be widely used in various fields that need wireless remote controls. The advantage and spirit of the invention may be understood by the following recitations together with the appended drawings.

BRIEF DESCRIPTION OF THE APPENDED DRAWINGS

FIG. 1 illustrates the wireless remote control system in the first embodiment according to the invention.

Figure 2A:
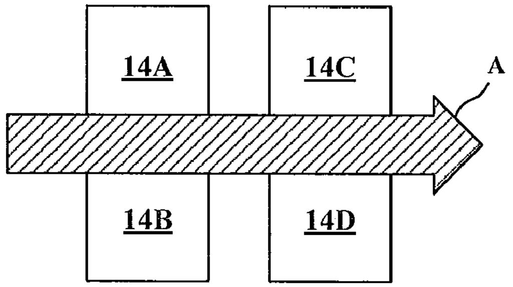
Figure 2B:
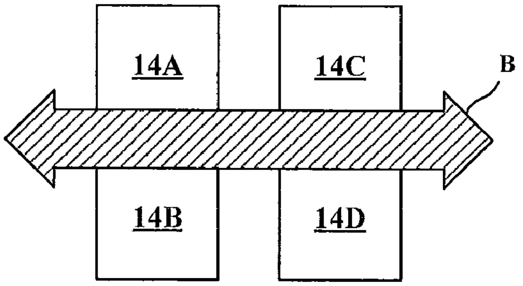

FIG. 2(A) and FIG. 2(B) show examples of the movement patterns of the remote controller relative to the detectors.

The tables in FIG. 3(A) and FIG. 3(B) illustrate the characteristics of the frequency differences under different movement patterns.

DETAILED DESCRIPTION OF THE INVENTION

Frequency shift induced by the Doppler effect of a wireless signal is the basis for detecting the movement pattern made by a remote controller in the wireless remote control system according to the invention. As known by those skilled in the art, when there is a relative movement between a signal source and an observer, the relationship between the detected frequency of the signal (f) and the original frequency ($f_0$) at the transmitting end is:

$$f = \frac{v + v_r}{v + v_s} f_0 = \frac{1 + \frac{v_r}{v}}{1 + \frac{v_s}{v}} f_0,$$

In this equation, v represents the speed of the signal, $v_s$ represents the moving velocity of the signal source along the direction from the observer to the source, and $v_r$ represents the velocity of the observer along the direction. If both the location of the observer and the frequency of the emitted signal source are fixed, then $f_0$ and $v_r$ are constants. If the signal source is a remote controller hold by a user, $v_s$ is related to the motion of the user's hand. Generally, the speed of movement by human hands is roughly in the range of 1 m/s~3 m/s, which is much lower than the speed of sound waves. Therefore, in the case of ultrasonic signal the above equation can be modified as:

$$f \propto \frac{1}{1 + \frac{v_s}{v}} = 1 - \frac{v_s}{v} + \left(\frac{v_s}{v}\right)^2 - \left(\frac{v_s}{v}\right)^3 + \ldots \approx 1 - \frac{v_s}{v}$$

As shown in this equation, the observed frequency (f) and the velocity of the sound source along a direction ($v_s$) are approximately linearly related. Based on this relationship, the wireless remote control system according to the invention can continuously estimate and monitor the velocity of a remote controller and thus determine its movement pattern.

FIG. 1 illustrates the wireless remote control system in the first embodiment according to the invention. The system in this embodiment includes a remote controller (not shown), four detectors (14A~14D) arranged substantially as a rectangle on a plane, and a decision module 16. The remote controller is used for emitting a wireless signal. According to the invention, the wireless signal can be an ultrasonic signal. In actual applications, the four detectors can also be arranged substantially as a rhombus.

The detectors 14A~14D detect the wireless signal emitted by the remote controller and respectively generate a detecting result. Since the positions of the detectors 14A~14D relative to the remote controller are different, the detectors 14A~14D generate different detecting results when the remote controller moves. Taking the detector 14A as an example, when the remote controller is moving toward the detector 14A, the frequency detected by the detector 14A ($f_1$) is higher than the frequency of the wireless signal emitted by the remote controller ($f_0$), which is unknown to the decision module. When the remote controller is moving away from the detector 14A, $f_1$ is lower than $f_0$. Similarly, when the remote controller is moving toward the detector 14B, the frequency detected by the detector 14B ($f_2$) is higher than $f_0$. When the remote controller is moving away from the detector 14B, $f_2$ is lower than $f_0$.

Based on the relative relationship of the frequencies, the decision module 16 can determine the movement pattern of the remote controller (i.e., the gesture of the user) by calculating the differences between the detected frequencies. For instance, if the remote controller moves along the arrow A shown in FIG. 2(A), when the remote controller is moving away from the detector 14A but close to the detector 14C, the frequency detected by the detector 14A ($f_1$) is lower than $f_0$, and the frequency detected by the detector 14C ($f_3$) is higher than $f_0$. During this period, the result of subtracting $f_3$ from $f_1$ is negative. On the contrary, if the remote controller moves along the direction opposite to the arrow A, when the remote controller is moving away from the detector 14C but close to the detector 14A, $f_1$ is higher than $f_0$, and $f_3$ is lower than $f_0$. In this period, the result of subtracting $f_3$ from $f_1$ is positive.

It can be seen that if the wireless remote control system includes two detectors spaced apart along a specific direction, the decision module 16 can determine if the remote controller moves along the specific direction or along a reverse direction opposite to the specific direction based on the frequency difference between the detecting results of the two detectors. Further, when the remote controller moves repeatedly along the arrow B shown in FIG. 2(B), the frequency difference between the detectors 14A and 14C is periodical and alternatively changes between positive and negative values. Similarly, under this condition, the frequency difference between the detectors 14B and 14D is also periodic. According to these results, the decision module 16 can judge that the user moves the remote controller along the horizontal direction shown as the arrow B.

As described above, the decision module 16 judges the movement pattern of the remote controller based on at least one frequency difference between the detecting results. In other words, the decision module 16 according to the invention can calculate the frequency differences between the detecting results without the knowledge of $f_0$. Therefore, the infrared transmitter and infrared receiver for synchronizing $f_0$ in prior arts are unnecessary in the wireless remote control system according to the invention.

The tables shown in FIG. 3(A) and FIG. 3(B) further illustrate the characteristics of the frequency differences or sum under the conditions when the remote controller moves horizontally, vertically, obliquely (including from-right-to-left and from-left-to-right), circularly (including clockwise and counterclockwise), or back and forth. The symbols $f_1$~$f_4$ respectively represent the frequency detected at the detectors 14A~14D. Based on the change patterns of the frequency differences in time domain, the decision module 16 can judge the movement pattern of the remote controller in the space. Practically, the decision module 16 can judge the movement pattern of the remote controller based on whether the frequency differences are periodical signals or combinations of plural periodical signals.

After determining the movement pattern of the remote controller, the decision module 16 can optionally generate a control signal and transfer the control signal to a subsequent electronic or mechanical system. Corresponding to different movement patterns, the decision module 16 can generate different control signals. For instance, the control signal can be used to turn on/off a television, adjust the volume of the television, select the channel of the television, or adjust the temperature of an air conditioner.

As shown in the examples mentioned in FIG. 3(A) and FIG. 3(B), users can give various commands by moving the remote controller with simple gestures. In actual applications, the remote controller can be as simple as including only one battery and an oscillating circuit for generating the wireless signal. Therefore, both the cost and power consumption of the remote controller are considerably low. Moreover, the size of the remote controller is quite small and can be integrated in an ornament, such as a ring, or personal belongings (for instance, a mobile phone, a watch, or a pen).

Practically, the detectors 14A~14D can include frequency detection circuits for determining the frequency of the wireless signal based on the number of voltage transitions of the wireless signal. The decision module 16 can include a circuit or software for analyzing the spectrum of the frequency differences between two detectors. In this spectrum, if the value at some frequency is above a certain threshold, the decision module 16 can decide that the remote controller has some obvious periodic movement along the direction of those two detectors. Moreover, the number of detectors in wireless remote control systems according to the invention can be different from that in this embodiment. For instance, using one, two, three, six, eight, or more detectors is also possible. Furthermore, if there is a need for more than the seven commands in FIG. 3(A) and FIG. 3(B), a combination of two or more movement patterns can be applied in sequence to make up more commands, for instance, clockwise circular motion followed by top-down motion.

In practical applications, the decision module 16 can determine the movement pattern only when at least one detecting result among the detecting results conforms to a predetermined frequency limitation. By excluding signals with frequencies lower than a lowest limit, low frequency noises can be filtered out; this can also be a limitation for judging whether the wireless signal emitted by the remote controller exists. By excluding signals with frequencies higher than an upper limit, high frequency noises can be filtered out from the detected signals. In other words, the decision module 16 can be designed as only operating for stable wireless signals in a particular frequency band.

Furthermore, as described above, the frequencies respectively detected by the detectors 14A~14D are linearly related to the velocities along corresponding directions of the remote controller. Accordingly, the frequency difference between two detecting results is also directly proportional to the velocity difference between the moving velocities of the remote controller respectively relative to the two detectors. If the wireless remote control system according to the invention includes two detectors disposed along a specific direction, the decision module 16 can estimate the velocity of the remote controller along the specific direction based on the frequency difference between the detector outputs.

Since the decision module 16 can estimate the velocity and moving direction of the remote controller according to the detecting results of the detectors 14A~14D, the decision module 16 can further integrate the moving velocity in time domain, so as to determine and record a trajectory of the remote controller in the space. By doing this, the manager/designer of the wireless remote control system according to the invention can further define more commands corresponding to more complicated gestures. For example, users can input icons, symbols, numbers, letters in alphabets, or Chinese characters via the remote controller.

In practical applications, if there is a need of distinguishing plural users or plural apparatuses to be controlled, a multiple access modulation can be performed on the wireless signal before the wireless signal is emitted from the remote controller. The multiple access modulation, for example, can be a time division multiple access (TDMA) modulation, a code division multiple access (CDMA) modulation, or a frequency division multiple access (FDMA) modulation. Thereby, identification information can be added into the wireless signal.

Correspondingly, the decision module 16 can include a demodulating unit for demodulating the wireless signal and determining identification information of the remote controller. For instance, the designer or manager of the wireless remote control system can define ten frequencies (e.g. 36 KHz, 37 KHz, 38 KHz . . . , and 45 KHz); every remote controller can select three frequencies therefrom and emit signals of the three frequencies. There would be about 1,200 frequency combinations. According to the frequency components of a wireless signal, the decision module 16 can also distinguish different remote controllers. With this arrangement, the identification of the user can be determined by the decision module 16. This user identification information can facilitate further control of the user commands, e.g., young children are not allowed to enter commands that will lead them to viewing of improper content.

The idea of the invention can also be applied in the condition with only one detector. Another embodiment according to the invention is a wireless remote control system including a remote controller, a detector, and a decision module. Based on at least one frequency difference between the detecting results detected at different times, the decision module in this embodiment determines the movement pattern of the remote controller and generates a control signal according to the movement pattern.

Taking the condition when the detector is set on a certain wall as an example, when the remote controller has a moving vector along the direction perpendicular to and toward the wall (corresponding to the gesture in the right column in FIG. 3(B)), the detector detects a higher frequency. Assuming the detecting result detected at a first time instant is a first frequency and the detecting result detected at a second time instant is a second frequency, the decision module can determine if the remote controller moves back and forth along the direction perpendicular to the wall based on the frequency difference between the first frequency and the second frequency.

Another embodiment according to the invention is also a wireless remote control system including a remote controller, a detector, and a decision module. The detector in this embodiment is used for detecting the frequency of the wireless signal emitted by the remote controller. The decision module generates a control signal according to a time pattern of the frequency, which is related to the movement pattern of the remote controller. As explained above, a forward-backward motion of the remote controller is corresponding to a high-low time pattern of the detected frequency. For instance, three periods of forward-backward motion is deemed a long "dash" and one period of forward-backward motion is deemed a short "dot." This Morse-code-like combination can constitute several different commands recognized by the decision module using only one detector. It should be noted that the decision module in this embodiment does not have to know the frequency of the wireless signal emitted by the remote controller ($f_0$), either.

As described above, the wireless remote controller according to the invention has many advantages, such as small size, low cost, low power consumption, and easy to use. Further, the wireless remote control system according to the invention can be widely used in various fields that need wireless remote control. Compared with most remote control systems utilizing infrared or RF signals at the present time, the detecting circuit in the invention has lower operation frequencies. Hence, not only the remote controller but also the detecting circuit according to the invention has the advantages of low cost and low power consumption.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A wireless remote control system, comprising:
- a remote controller for emitting a wireless signal;
- a plurality of detectors for detecting the wireless signal and respectively generating a detecting result; and
- a decision module electrically connected to the detectors, based on at least one frequency difference between the detecting results, the decision module determining a movement pattern of the remote controller and generating a control signal according to the movement pattern.

2. The wireless remote control system of claim 1, wherein the wireless signal is an ultrasonic signal.

3. The wireless remote control system of claim 1, wherein the plural detectors comprise a first detector and a second detector disposed along a specific direction, the detecting result of the first detector is a first frequency, the detecting result of the second detector is a second frequency, based on the frequency difference between the first frequency and the second frequency, the decision module determines if the remote controller moves along the specific direction or along a reverse direction opposite to the specific direction.

4. The wireless remote control system of claim 1, wherein the plural detectors comprise a first detector and a second detector disposed along a specific direction, the detecting result of the first detector is a first frequency, the detecting result of the second detector is a second frequency, based on the frequency difference between the first frequency and the second frequency, the decision module determines a moving speed of the remote controller along the specific direction.

5. The wireless remote control system of claim 1, wherein the decision module determines the movement pattern of the remote controller based on a change pattern of the frequency difference in time domain.

6. The wireless remote control system of claim 5, wherein the decision module determines the movement pattern of the remote controller based on whether the frequency difference follows a periodical pattern or a combination of plural periodical patterns.

7. The wireless remote control system of claim 1, wherein corresponding to conditions that the remote controller moves horizontally, vertically, obliquely, circularly, or back and forth, the control signal is different.

8. The wireless remote control system of claim 1, wherein the plural detectors comprise four detectors arranged substantially as a rectangle or a rhombus on a plane.

9. The wireless remote control system of claim 1, wherein the decision module further determines and records a movement trajectory of the remote controller based on the frequency difference.

10. The wireless remote control system of claim 9, wherein the decision module determines a moving velocity and a moving direction of the remote controller based on the frequency difference and determines the movement trajectory according to the moving velocity and the moving direction.

11. The wireless remote control system of claim 1, wherein a multiple access modulation is performed on the wireless signal before the wireless signal is emitted from the remote controller; the decision module comprises a demodulating unit for demodulating the wireless signal and determines identification information of the remote controller.

12. The wireless remote control system of claim 11, wherein the multiple access modulation is a time division multiple access (TDMA) modulation, a code division multiple access (CDMA) modulation, or a frequency division multiple access (FDMA) modulation.

13. The wireless remote control system of claim 1, wherein only when at least one detecting result among the detecting results conforms to a predetermined frequency limitation, the decision module determines the movement pattern based on the at least one frequency difference.

14. The wireless remote control system of claim 1, wherein the remote controller comprises a battery and an oscillating circuit for generating the wireless signal.

15. The wireless remote control system of claim 1, wherein each of the detectors respectively comprises a frequency detection circuit for determining a frequency of the wireless signal based on the number of transitions of the wireless signal.

16. A wireless remote control system, comprising:
- a remote controller for emitting a wireless signal;
- a detector for detecting the wireless signal and generating a detecting result; and
- a decision module electrically connected to the detector, based on at least one frequency difference between the detecting results detected at different time instants, the decision module determining a movement pattern of the remote controller and generating a control signal according to the movement pattern.

17. The wireless remote control system of claim 16, wherein the wireless signal is an ultrasonic signal.

18. The wireless remote control system of claim 16, wherein the detecting result detected at a first time instant is a first frequency, the detecting result detected at a second time instant is a second frequency, based on the frequency difference between the first frequency and the second frequency, the decision module determines if the remote controller moves along a specific direction or along a reverse direction opposite to the specific direction.

19. The wireless remote control system of claim 16, wherein the detecting result detected at a first time instant is a first frequency, the detecting result detected at a second time instant is a second frequency, based on the frequency difference between the first frequency and the second frequency, the decision module determines a moving speed of the remote controller at a specific direction.

20. A wireless remote control system, comprising:
- a remote controller for emitting a wireless signal;
- a detector for detecting a frequency the wireless signal; and
- a decision module electrically connected to the detector, for generating a control signal according to a time pattern of the frequency.

* * * * *